United States Patent
Ide

(10) Patent No.: US 10,195,960 B2
(45) Date of Patent: Feb. 5, 2019

(54) VEHICLE

(71) Applicant: TOYOTA JIDOSHA KABUSHIKI KAISHA, Toyota-shi, Aichi-ken (JP)

(72) Inventor: Akihiko Ide, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/785,607

(22) Filed: Oct. 17, 2017

(65) Prior Publication Data

US 2018/0105065 A1 Apr. 19, 2018

(30) Foreign Application Priority Data

Oct. 18, 2016 (JP) .................. 2016-204363

(51) Int. Cl.
| | |
|---|---|
| *H02P 5/46* | (2006.01) |
| *B60L 15/20* | (2006.01) |
| *H02P 29/028* | (2016.01) |
| *B62B 3/12* | (2006.01) |
| *B60K 7/00* | (2006.01) |

(52) U.S. Cl.
CPC ........ *B60L 15/2036* (2013.01); *B60K 7/0007* (2013.01); *B62B 3/12* (2013.01); *H02P 29/028* (2013.01); *B60K 2007/0092* (2013.01); *B60L 2240/24* (2013.01); *B60L 2240/36* (2013.01)

(58) Field of Classification Search
CPC ........ H02P 29/032; H02P 27/06; B60W 10/08
See application file for complete search history.

(56) References Cited

U.S. PATENT DOCUMENTS

| | | | | |
|---|---|---|---|---|
| 2009/0021198 A1* | 1/2009 | Okamura | ............... | H02P 29/032 318/400.3 |
| 2012/0185143 A1* | 7/2012 | Ohno | ................... | B60L 3/0061 701/99 |
| 2013/0249282 A1* | 9/2013 | Ishii | ...................... | H02J 7/0055 307/10.1 |

FOREIGN PATENT DOCUMENTS

| | | |
|---|---|---|
| JP | 3106853 B2 | 11/2000 |
| JP | 2014-93849 A | 5/2014 |
| JP | 5731593 B2 | 6/2015 |
| JP | 5919012 B2 | 5/2016 |

\* cited by examiner

*Primary Examiner* — Karen Masih
(74) *Attorney, Agent, or Firm* — Sughrue Mion, PLLC

(57) ABSTRACT

When two motors are in a locked state in which electric current is flowed in a concentrated manner in a specific phase in the two motors, a lock protection control is performed to rotate the two motors to change over a phase in which electric current is flowed in a concentrated manner in the two motors. The lock protection control rotates the two motors such that a vehicle is turned.

7 Claims, 9 Drawing Sheets

VEHICLE

This application claims priority to Japanese Patent Application No. 2016-204363 filed 18 Oct. 2016, the contents of which is incorporated herein by reference.

TECHNICAL FIELD

The present disclosure relates to a vehicle.

BACKGROUND

In a vehicle provided with a motor for driving and an inverter for driving the motor, in response to detection of a locked state (stall state) of the motor, a proposed configuration performs protection control of the inverter to restrict a torque of the motor when the temperature of the inverter rises to or above a reference value (for example, Japanese Patent No. 5919012). The vehicle of this proposed configuration restricts the torque of the motor, in order to reduce electric current supplied from a battery to the inverter and suppress a temperature rise of switching elements of the inverter.

SUMMARY

In a vehicle provided with two motors configured to respectively drive left and right drive wheels and two inverters configured to respectively drive the two motors, when the two motors are in a locked state (in the state that electric current is flowed in a concentrated manner in a specific phase), one available technique rotates the two motors (drive wheels) to change over the phase in which electric current is flowed in a concentrated manner in the two motors, in order to suppress a temperature rise in the two motors and the two inverters. When the two motors are equally rotated rearward to move the vehicle straight back, this technique may provide a relatively long retreating distance (i.e., moving distance to right behind).

In a vehicle provided with two motors configured to respectively drive left and right drive wheels and two inverters configured to respectively drive the two motors, when the two motors are in a locked state, a main object of the present disclosure is to suppress a temperature rise in the two motors and the two inverters and reduce a retreating distance of the vehicle.

In order to achieve the above main object, the vehicle of the present disclosure may be implemented by the following aspects.

According to one aspect, there is provided a vehicle including: two motors configured to respectively drive left and right drive wheels; two inverters configured to respectively drive the two motors; a power storage device configured to transmit electric power to and from the two motors via the two inverters; and a control device configured to perform a lock protection control that rotates the two motors to change over a phase in which electric current is flowed in a concentrated manner in the two motors, when the two motors are in a locked state in which electric current is flowed in a concentrated manner in a specific phase in the two motors, wherein the control device performs the lock protection control that rotates the two motors such that the vehicle is turned.

In this aspect of the vehicle of the present disclosure, when the two motors are in the locked state in which electric current is flowed in a concentrated manner in the specific phase in the two motors, the lock protection control is performed to rotate the two motors to change over the phase in which electric current is flowed in a concentrated manner in the two motors. The lock protection control rotates the two motors such that the vehicle is turned. This configuration changes over the phase in which electric current is flowed in a concentrated manner in the two motors and thereby suppresses a temperature rise in the two motors and the two inverters, while reducing a retreating distance of the vehicle (i.e., a moving distance to right behind) compared with compared with the lock protection control that rotates the two motors to move the vehicle straight back. As a result, this configuration enables the lock protection control to be performed even in the case of a relatively short allowable retreating distance (in the case where an object is present behind the vehicle).

DESCRIPTION OF EMBODIMENTS

The following describes some aspects of the present disclosure with reference to drawings.

Figure 1:
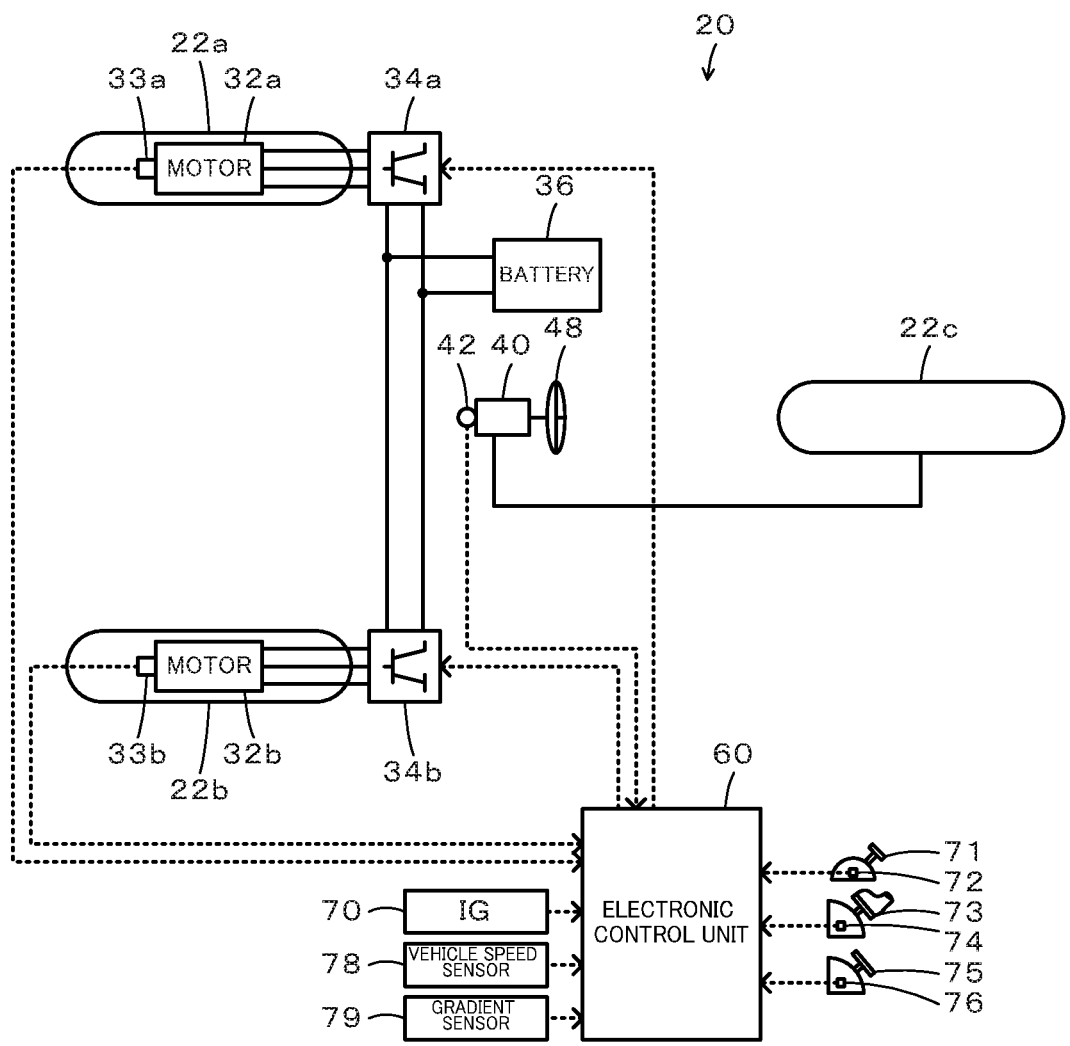
FIG. 1 is a configuration diagram illustrating the schematic configuration of an electric vehicle according to one embodiment of the present disclosure.

FIG. 1 is a configuration diagram illustrating the schematic configuration of an electric vehicle 20 according to one embodiment of the present disclosure. As illustrated, the electric vehicle 20 of the embodiment is configured as a three-wheeled vehicle provided with a right front wheel 22*a* and a left front wheel 22*b* that are arranged to be opposed to each other and a rear wheel 22*c* as one steering wheel, and includes a motor for right front wheel 32a, a motor for left front wheel 32b, inverters 34a and 34b, a battery 36, a steering device 40, and an electronic control unit 60.

The motor for right front wheel 32a and the motor for left front wheel 32b are respectively placed in the right front wheel 22a and in the left front wheel 22b and are configured as synchronous generator motors (in-wheel motors) including a rotor with permanent magnets embedded therein and a stator with three-phase coils wound thereon, to output the driving force to the right front wheel 22a and the left front wheel 22b. According to this embodiment, identical motors are employed as the motor for right front wheel 32a and the motor for left front wheel 32b. The inverters 34a and 34b are respectively used to drive the motor for right front wheel 32a and the motor for left front wheel 32b. The electronic control unit 60 performs switching control of a plurality of switching elements (not shown) included in the respective inverters 34a and 34b, so as to rotate and drive the motor for right front wheel 32a and the motor for left front wheel 32b.

The battery 36 may be configured as, for example, a lithium ion rechargeable battery or a nickel metal hydride battery and is arranged to transmit electric power to and from the motor for right front wheel 32a and the motor for left front wheel 32b via the inverters 34a and 34b.

The steering device 40 is configured by mechanically connecting a steering wheel 48 with the rear wheel 22c via a steering shaft and steers the rear wheel 22c based on the driver's operation of the steering wheel 48 (i.e., adjusts the turning angle of the rear wheel 22c). The steering device 40 may alternatively be configured as a steering-by-wire system, in which the steering wheel 48 and the rear wheel 22c are not mechanically connected with each other.

The electronic control unit 60 is configured as a CPU-based microprocessor and includes a ROM configured to store processing programs, a RAM configured to temporarily store data, input/output ports and a communication port, in addition to the CPU, although not being illustrated. Signals from various sensors are input into the electronic control unit 60 via the input port. The signals input into the electronic control unit 60 include, for example, rotational positions θma and θmb of the rotors of the motor for right front wheel 32a and the motor for left front wheel 32b from rotational position detection sensors 33a and 33b that are respectively configured to detect the rotational positions of the rotors of the motor for right front wheel 32a and the motor for left front wheel 32b, and a steering angle θst from a steering angle sensor 42 that is mounted to the steering device 40 and that is configured to detect the steering angle of the steering wheel 48. The input signals also include an ignition signal from an ignition switch 70 and a shift position SP from a shift positions sensor 72 that is configured to detect the operating position of a shift lever 71. The input signals further include an accelerator position Acc from an accelerator pedal position sensor 74 that is configured to detect a depression amount of an accelerator pedal 73, a brake pedal position BP from a brake pedal position sensor 76 that is configured to detect a depression amount of a brake pedal 75, a vehicle speed V from a vehicle speed sensor 78 and a road surface gradient θrd from a gradient sensor 79. For example, a parking position (P position), a reverse position (R position), a neutral position (N position) and a drive position (D position) are provided as options of the shift position SP. The electronic control unit 60 outputs various control signals via the output port. The signals output from the electronic control unit 60 include, for example switching control signals to the plurality of switching elements included in the respective inverters 34a and 34b. The electronic control unit 60 calculates electric angles θea and θeb and rotation speed Nma and Nmb of the motor for right front wheel 32a and the motor for left front wheel 32b, based on the rotational positions θma and θmb of the rotors of the motor for right front wheel 32a and the motor for left front wheel 32b from the rotational position detection sensors 33a and 33b.

In the electric vehicle 20 of the embodiment having the above configuration, the electronic control unit 60 basically preforms the following drive control. The drive control first sets a required driving force Fd* that is required for the vehicle, based on the accelerator position Acc and the vehicle speed V. The drive control subsequently sets driving force distribution rates Da and Db (where Da+Db=1) of the motor for right front wheel 32a and the motor for left front wheel 32b, based on the steering angle θst. According to this embodiment, the driving force distribution rates Da and Db of the motor for right front wheel 32a and the motor for left front wheel 32b are both set to a value 0.5 during going straight (with the steering angle θset equal to value 0) and are set to decrease the driving force on the inner wheel side and increase the driving force on the outer wheel side during turning (with the steering angle θset not equal to the value 0). After setting the driving force distribution rates Da and Db of the motor for right front wheel 32a and the motor for left front wheel 32b, the drive control multiplies the required driving force Fd* by the driving force distribution rates Da and Db of the motor for right front wheel 32a and the motor for left front wheel 32b to set driving force commands Fma* and Fmb* of the motor for right front wheel 32a and the motor for left front wheel 32b. The drive control then performs witching control of the plurality of switching elements included in the inverters 34a and 34b to drive the motor for right front wheel 32a and the motor for left front wheel 32b with the driving force commands Fma* and Fmb*.

Figure 2:
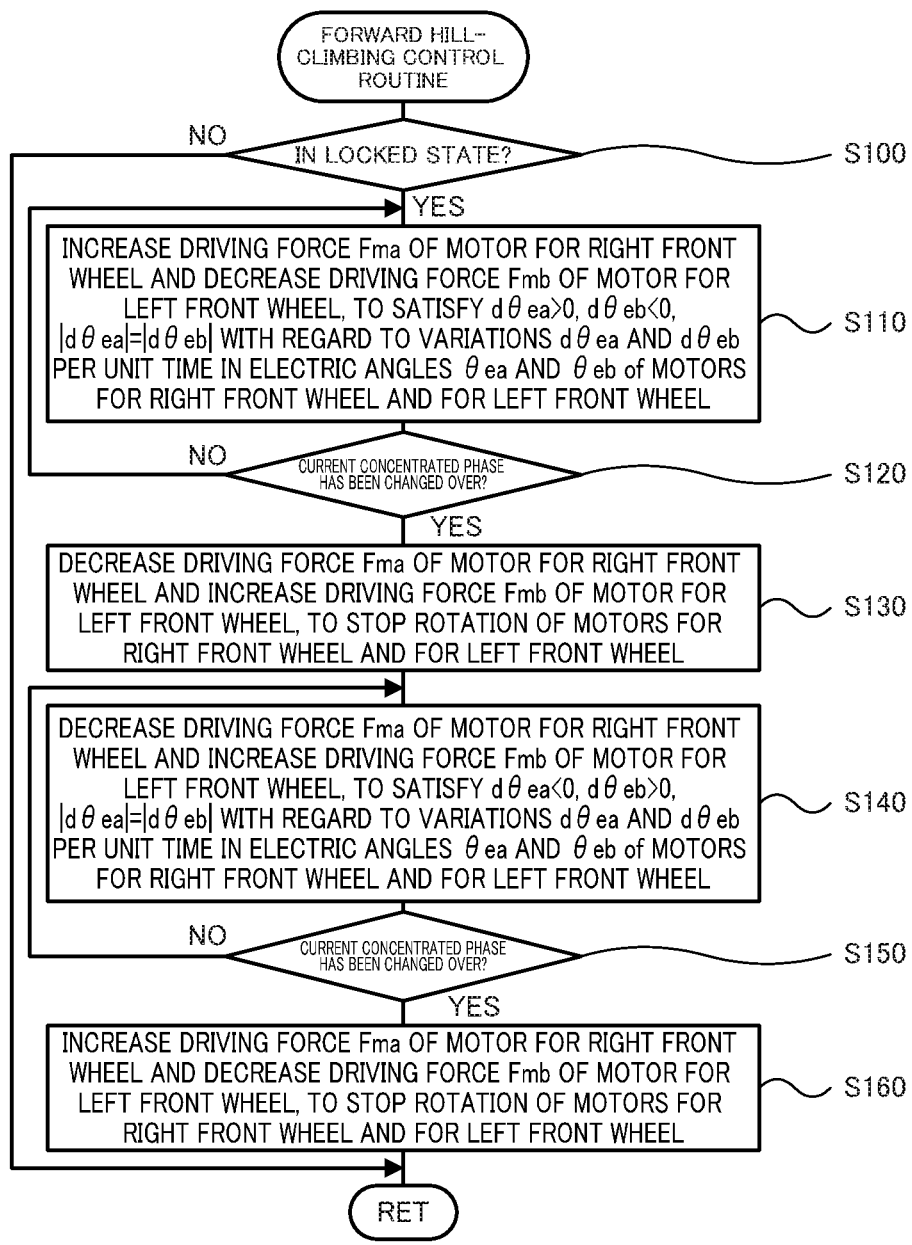
FIG. 2 is a flowchart showing one example of a forward hill-climbing control routine performed by an electronic control unit according to the embodiment.

The following describes the operations of the electric vehicle 20 of the embodiment having the above configuration or more specifically operations during forward hill climbing (on an uphill road at the shift position SP set to the drive position). FIG. 2 is a flowchart showing one example of forward hill-climbing control routine performed by the electronic control unit 60 according to the embodiment. This routine is performed repeatedly during forward hill climbing.

When the forward hill-climbing control routine is triggered, the electronic control unit 60 first determines whether the motor for right front wheel 32a and the motor for left front wheel 32b are in a locked state (step S100). When it is determined that the motor for right front wheel 32a and the motor for left front wheel 32b are not in the locked state, the electronic control unit 60 terminates this routine. In this case, the drive control described above is performed.

The "lock state" herein denotes a state that the motor for right front wheel 32a and the motor for left front wheel 32b practically stop rotation irrespective of output of the driving force from the motor for right front wheel 32a and the motor for left front wheel 32b, i.e., a state that electric current is flowed in a concentrated manner in a specific phase of the motor for right front wheel 32a and the motor for left front wheel 32b. In this state, the temperature is likely to rise in the motor for right front wheel 32a and the motor for left front wheel 32b and in the inverters 34a and 34b. According to this embodiment, when absolute values of the driving force commands Fma* and Fmb* of the motor for right front wheel 32a and the motor for left front wheel 32b set in the same manner as that in the drive control described above are both greater than a reference value Fmref (for example, several Nm) and absolute values of the rotation speeds Nma and Nmb of the motor for right front wheel 32a and the motor for left front wheel 32b are both equal to or lower than a reference value Nmref (for example, several ten rpm), it is determined that the motor for right front wheel 32a and the motor for left front wheel 32b are in the locked state.

Figure 3:
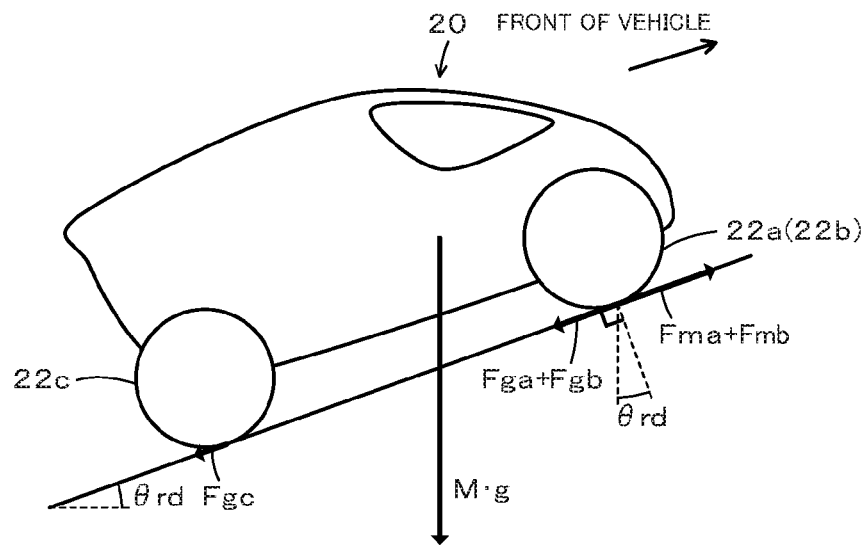
FIG. 3 is a diagram illustrating one example of vehicle state when a motor for right front wheel and a motor for left front wheel are in a locked state.
Figure 4:
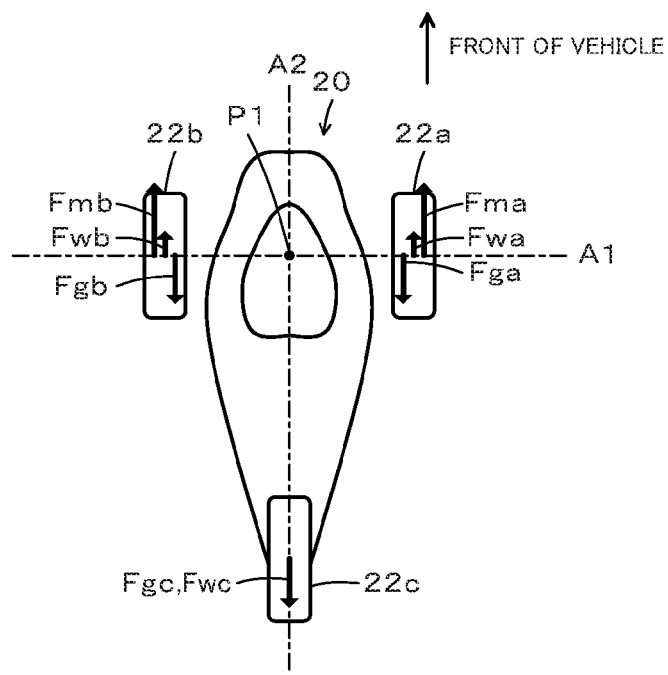
FIG. 4 is a diagram illustrating the example of vehicle state when the motor for right front wheel and the motor for left front wheel are in the locked state.
Figure 5:
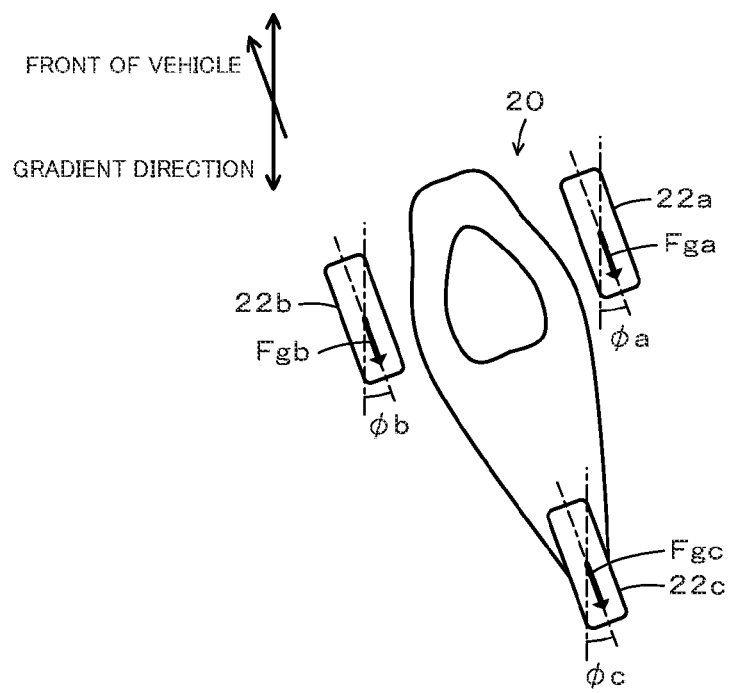
FIG. 5 is a diagram illustrating one example of retreating forces Fga, Fgb and Fgc respectively applied to a right front wheel, a left front wheel and a rear wheel during forward hill climbing.

FIG. 3 and FIG. 4 are diagrams illustrating one example of the vehicle state when the motor for right front wheel 32a and the motor for left front wheel 32b are in the locked state (before a start of lock protection control described later). FIG. 5 is a diagram illustrating one example of reverse forces (hereinafter called "retreating forces") Fga, Fgb and Fgc due to a vehicle mass M respectively applied to the right front wheel 22a, the left front wheel 22b and the rear wheel 22c during forward hill climbing. In FIG. 4, "A1" denotes a straight line passing through the center of the right front wheel 22a and the center of the left front wheel 22b in a vehicle left-right direction (vehicle width direction), "A2" denotes a straight line passing through the center of the vehicle left-right direction (vehicle width direction) in a vehicle longitudinal direction (passing through the center of the rear wheel 22c), and "P1" denotes the position of an intersection of the straight line A1 with the straight line A2. In the following description, it is assumed that the respective forces (shown by thick straight arrows in FIGS. 3 to 5) have positive values in the forward moving direction of the vehicle. When the motor for right front wheel 32a and the motor for left front wheel 32b are in the locked state during forward hill climbing, an absolute value of a forward driving force Fm of the vehicle as the sum of driving forces Fma and Fmb of the motor for right front wheel 32a and the motor for left front wheel 32b is equal to an absolute value of a retreating force Fg applied to the vehicle as the sum of the retreating forces Fga, Fgb and Fgc respectively applied to the right front wheel 22a, the left front wheel 22b and the rear wheel 22c. The retreating forces Fga, Fgb and Fgc respectively applied to the right front wheel 22a, the left front wheel 22b and the rear wheel 22c may be determined according to Equations (1) to (3) given below using the vehicle mass M, the acceleration of gravity g, load distribution rates Ga, Gb and Gc of the right front wheel 22a, the left front wheel 22b and the rear wheel 22c, the road surface gradient θrd and angles φa, φb and φc of the right front wheel 22a, the left front wheel 22b and the rear wheel 22c relative to the gradient direction of the uphill road. These Equations (1) to (3) are readily derived by using FIGS. 3 to 5. Forces Fwa and Fwb respectively applied to the right front wheel 22a and the left front wheel 22b may be determined according to Equations (4) and (5) given below using the driving force Fma and Fmb of the motor for right front wheel 32a and the motor for left front wheel 32b and the retreating forces Fga and Fgb respectively applied to the right front wheel 22a and the left front wheel 22b. The right front wheel 22a and the left front wheel 22b are arranged to be opposed to each other (i.e., to be parallel to each other), so that the angles φa and φb are equal to each other. A force Fwc applied to the rear wheel 22c serves as the retreating force Fgc applied to the rear wheel 22c.

$$Fga = M \cdot g \cdot Ga \cdot \sin(\theta rd) \cdot \cos(\phi a) \quad (1)$$

$$Fgb = M \cdot g \cdot Gb \cdot \sin(\theta rd) \cdot \cos(\phi b) \quad (2)$$

$$Fgc = M \cdot g \cdot Gc \cdot \sin(\theta rd) \cdot \cos(\phi c) \quad (3)$$

$$Fwa = Fma - Fga \quad (4)$$

$$Fwb = Fmb - Fgb \quad (5)$$

When it is determined at step S100 that the motor for right front wheel 32a and the motor for left front wheel 32b are in the locked state, on the other hand, the electronic control unit 60 performs lock protection control (steps S110 to S160) and then terminates this routine. The "lock protection control" herein denotes control of rotating the motor for right front wheel 32a and the motor for left front wheel 32b to change over the phase in which electric current is flowed in a concentrated manner in the motor for right front wheel 32a and the motor for left front wheel 32b. According to this embodiment, when it is determined that the motor for right front wheel 32a and the motor for left front wheel 32b are in the locked state (before a start of the lock protection control), it is assumed that the steering angle θst is equal to the value 0 and the direction of the right front wheel 22a, the left front wheel 22b and the rear wheel 22c is identical with the gradient direction of the uphill road, i.e., all the angles φa, φb and φc in Equations (1) to (3) given above are equal to the value 0.

The lock protection control first performs a first turning process that increases the driving force Fma of the motor for right front wheel 32a and decreases the driving force Fmb of the motor for left front wheel 32b, so as to satisfy the relationships of "dθea>0, dθeb<0 and |dθea|=|dθeb|" with regard to variations dθea and dθeb per unit time in the electric angles θea and θeb of the motor for right front wheel 32a and the motor for left front wheel 32b (step S110). The driving forces Fma and Fmb of the motor for right front wheel 32a and the motor for left front wheel 32b are changed (increased or decreased) by changing the driving force commands Fma* and Fmb* of the motor for right front wheel 32a and the motor for left front wheel 32b and by controlling the inverters 34a and 34b using these driving force commands Fma* and Fmb*. According to this embodiment, the first turning process is performed to satisfy the relationship of "|dθea|=|dθeb|=dθe1*". The value dθe1* used here is preferably a value of such a level that does not provide the driver with a feeling of strangeness.

After performing the first turning process, the lock protection control determines whether the phase in which electric current is flowed in a concentrated manner in the motor for right front wheel 32a and the motor for left front wheel 32b has been changed over by the first turning process (step S120). This determination may be based on, for example, determining whether absolute values of total variations Sθea1 and Sθeb1 of the electric angles θea and θeb of the motor for right front wheel 32a and the motor for left front wheel 32b since the start of the first turning process become equal to or higher than a reference value Sθeref (for example, 120 degrees). When it is determined that the phase in which electric current is flowed in a concentrated manner in the motor for right front wheel 32a and the motor for left front wheel 32b has not been changed over yet, the lock protection control returns to step S110. The processing of steps S110 and S120 is repeatedly performed (i.e., the first turning process is continued) until it is determined at step S120 that the phase in which electric current is flowed in a concentrated manner in the motor for right front wheel 32a and the motor for left front wheel 32b has been changed over.

Figure 6:
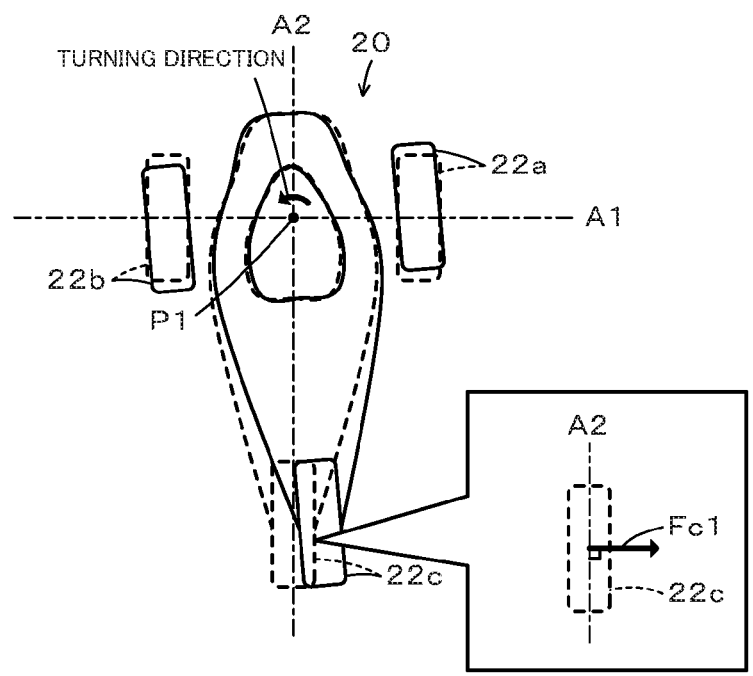
FIG. 6 is a diagram illustrating one example of the state of vehicle turning by a first turning process.

FIG. 6 is a diagram illustrating one example of the state of vehicle turning by the first turning process. In FIG. 6, broken lines show the state prior to turning of the vehicle, and solid lines show the state of vehicle turning. In FIG. 6, a "thick curved arrow" indicates the turning direction of the vehicle. A "thick straight arrow" in an enlarged view of FIG. 6 (enlarged view of the rear wheel 22c prior to turning of the vehicle) indicates a force Fc1 that is a force applied to the rear wheel 22c other than the retreating force Fgc described above during turning of the vehicle by the first turning process. The first turning process rotates the electric angle θea of the motor for right front wheel 32a toward the positive side (forward) and the electric angle θeb of the motor for left front wheel 32b toward the negative side (rearward) by rotation amounts of the same absolute values. This accordingly rotates the right front wheel 22a toward the positive side (forward) and the left front wheel 22b toward the negative side (rearward) by rotation amounts of the same absolute values. Accordingly the vehicle is turned counterclockwise about the position P1 as the center of turning as shown in FIG. 6. This changes over the phase in which electric current is flowed in a concentrated manner in the motor for right front wheel 32a and the motor for left front wheel 32b and thereby suppresses a temperature rise in the motor for right front wheel 32a and the motor for left front wheel 32b and in the inverters 34a and 34b, while reducing the retreating distance of the vehicle (i.e., the moving distance to right behind) compared with lock protection control that moves the vehicle straight back. According to this embodiment, the electric vehicle 20 is a three-wheeled vehicle including only one rear wheel 22c, so that the retreating distance of the vehicle is approximately zero. As a result, this configuration enables the lock protection control to be performed even in the case of a relatively short allowable retreating distance Llim (in the case where an object is present behind the vehicle). During turning of the vehicle by the first turning process, the rear wheel 22c is dragged by the force Fc1 that acts in a direction perpendicular to the straight line (straight line A2) passing through the center of turning (position P1) and the center of the rear wheel 22c (according to this embodiment, in a direction perpendicular to the direction of the rear wheel 22c (rightward direction of FIG. 6) since the steering angle θst is assumed to be value 0).

When it is determined at step S120 that the phase in which electric current is flowed in a concentrated manner in the motor for right front wheel 32a and the motor for left front wheel 32b has been changed over, the lock protection control performs a first rotation stop process that decreases the driving force Fma of the motor for right front wheel 32a and increases the driving force Fmb of the motor for left front wheel 32b, so as to stop rotation of the motor for right front wheel 32a and the motor for left front wheel 32b (step S130).

The lock protection control subsequently performs a second turning process that decreases the driving force Fma of the motor for right front wheel 32a and increases the driving force Fmb of the motor for left front wheel 32b, so as to satisfy the relationship of "dθea<0, dθeb>0 and |dθea|=|dθeb|" with regard to the variations dθea and dθeb per unit time in the electric angles θea and θeb of the motor for right front wheel 32a and the motor for left front wheel 32b (step S140). According to this embodiment, like the first turning process, the second turning process is performed to satisfy the relationship of "|dθea|=|dθeb|=dθe1*".

After performing the second turning process, the lock protection control determines whether the phase in which electric current is flowed in a concentrated manner in the motor for right front wheel 32a and the motor for left front wheel 32b has been changed over by the second turning process (step S150). This determination may be based on, for example, determining whether absolute values of total variations Sθea2 and Sθeb2 of the electric angles θea and θeb of the motor for right front wheel 32a and the motor for left front wheel 32b since the start of the second turning process become equal to or higher than the reference value Sθeref described above. When it is determined that the phase in which electric current is flowed in a concentrated manner in the motor for right front wheel 32a and the motor for left front wheel 32b has not been changed over yet, the lock protection control returns to step S140. The processing of steps S140 and S150 is repeatedly performed (i.e., the second turning process is continued) until it is determined at step S150 that the phase in which electric current is flowed in a concentrated manner in the motor for right front wheel 32a and the motor for left front wheel 32b has been changed over.

The second turning process rotates the electric angle θea of the motor for right front wheel 32a toward the negative side (rearward) and the electric angle θeb of the motor for left front wheel 32b toward the positive side (forward) by rotation amounts of the same absolute values. This accordingly rotates the right front wheel 22a toward the negative side (rearward) and the left front wheel 22b toward the positive side (forward) by rotation amounts of the same absolute values. Accordingly the vehicle is turned clockwise of FIG. 6 about the position P1 described above. This changes over the phase in which electric current is flowed in a concentrated manner in the motor for right front wheel 32a and the motor for left front wheel 32b and thereby suppresses a temperature rise in the motor for right front wheel 32a and the motor for left front wheel 32b and in the inverters 34a and 34b. During turning of the vehicle by the second turning process, the rear wheel 22c is dragged by a force Fc2 that acts in an opposite direction to that of the force Fc1 described above.

When it is determined at step S150 that the phase in which electric current is flowed in a concentrated manner in the motor for right front wheel 32a and the motor for left front wheel 32b has been changed over, the lock protection control performs a second rotation stop process that increases the driving force Fma of the motor for right front wheel 32a and decreases the driving force Fmb of the motor for left front wheel 32b, so as to stop rotation of the motor for right front wheel 32a and the motor for left front wheel 32b (step S160) and terminates the lock protection control and then this routine. As described above, performing the second turning process and the second rotation stop process after the first turning process and the first rotation stop process suppresses a significant shift in position of the vehicle between the start time and the end time of the lock protection control.

In a next cycle of this routine, when it is determined at step S100 that the motor for right front wheel 32a and the motor for left front wheel 32b are in the locked state, the electronic control unit 60 performs the lock protection control (steps S110 to S160) again and then terminates this routine. The lock protection control is performed repeatedly until it is determined at step S100 that the motor for right front wheel 32a and the motor for left front wheel 32b are not in the locked state.

In the electric vehicle 20 of the embodiment described above, when it is determined that the motor for right front wheel 32a and the motor for left front wheel 32b are in the locked state, the lock protection control is performed to rotate the motor for right front wheel 32a and the motor for left front wheel 32b, so as to turn the vehicle about, as the center of turning, the position P1 of the intersection of the straight line A1 that passes through the center of the right front wheel 22a and the center of the left front wheel 22b in the vehicle left-right direction (in the vehicle width direction) and the straight line A2 that passes through the center of the vehicle left-right direction (passes through the center of the rear wheel 22c) in the vehicle longitudinal direction. This changes over the phase in which electric current is flowed in a concentrated manner in the motor for right front wheel 32a and the motor for left front wheel 32b and thereby suppresses a temperature rise in the motor for right front wheel 32a and the motor for left front wheel 32b and in the inverters 34a and 34b, while reducing the retreating distance of the vehicle (i.e., the moving distance to right behind) compared with the lock protection control that moves the vehicle straight back. As a result, this configuration enables the lock protection control to be performed even in the case of a relatively short allowable retreating distance Llim (in the case where an object is present behind the vehicle).

When it is determined that the motor for right front wheel 32a and the motor for left front wheel 32b are in the locked state, the electric vehicle 20 of this embodiment performs the lock protection control to turn the vehicle counterclockwise of FIG. 6 about the position P1 as the center of turning and then turn the vehicle clockwise of FIG. 6 about the same position P1 as the center of turning. According to a modification, the lock protection control may be performed to turn the vehicle clockwise of FIG. 6 about the position P1 as the center of turning and then turn the vehicle counterclockwise of FIG. 6 about the same position P1 as the center of turning.

Figure 7:
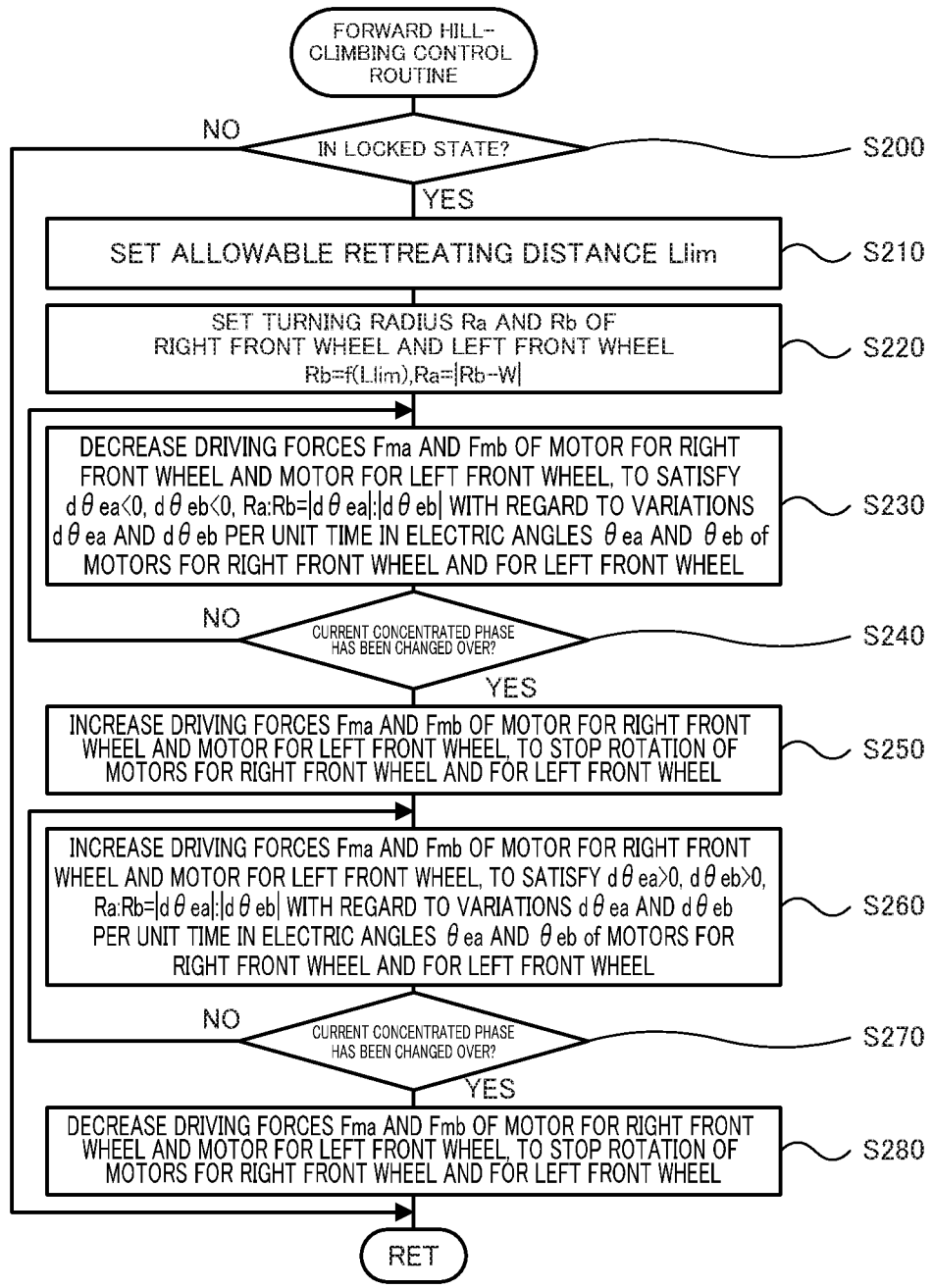
FIG. 7 is a flowchart showing one example of the forward hill-climbing control routine according to a modification.

When it is determined that the motor for right front wheel 32a and the motor for left front wheel 32b are in the locked state, the electric vehicle 20 of this embodiment turns the vehicle about the position P1 on the straight line A1 as the center of turning. According to a modification, the vehicle may be turned about a position other than the position P1 on the straight line A1 as the center of turning. FIG. 7 is a flowchart showing one example of the forward hill-climbing control routine according to this modification.

When the forward hill-climbing control routine of FIG. 7 is triggered, the electronic control unit 60 first determines whether the motor for right front wheel 32a and the motor for left front wheel 32b are in the locked state (step S200). When it is determined that the motor for right front wheel 32a and the motor for left front wheel 32b are not in the locked state, the electronic control unit 60 terminates this routine. In this case, the drive control described above is performed.

When it is determined at step S200 that the motor for right front wheel 32a and the motor for left front wheel 32b are in the locked state, on the other hand, the electronic control unit 60 performs lock protection control (steps S210 to S280) and then terminates this routine. Like the above embodiment, according to this modification, when it is determined that the motor for right front wheel 32a and the motor for left front wheel 32b are in the locked state (before a start of the lock protection control), it is assumed that the steering angle θst is equal to the value 0 and the direction of the right front wheel 22a, the left front wheel 22b and the rear wheel 22c is identical with the gradient direction of the uphill road, i.e., all the angles φa, φb and φc in Equations (1) to (3) given above are equal to the value 0.

The lock protection control first sets an allowable retreating distance Llim of the vehicle (step S210). The allowable retreating distance Llim may be set by measuring a distance from an object behind the vehicle using, for example, a millimeter wave radar, an ultrasonic sonar or a back view camera (not shown).

Figure 8:
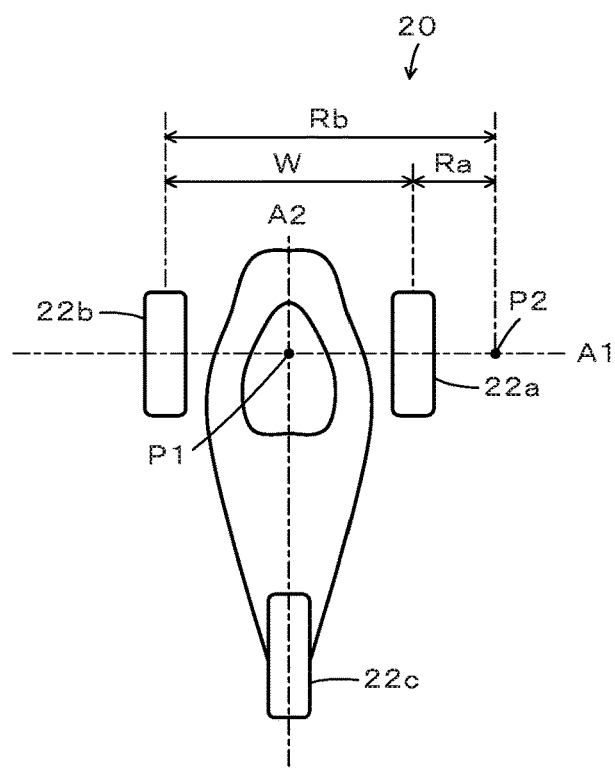
FIG. 8 is a diagram illustrating one example of relationship of a turning radius Ra of the right front wheel and a turning radius Rb of the left front wheel to a tread W.

After setting the allowable retreating distance Llim, the lock protection control sets a turning radius Ra of the right front wheel 22a and a turning radius Rb of the left front wheel 22b when the vehicle is turned by the lock protection control, based on the set allowable retreating distance Llim (step S220). According to this modification, the turning radius Rb of the left front wheel 22b is set in a range that is longer than an inter-center distance (hereinafter called "tread") W of the right front wheel 22a and the left front wheel 22b, such that the longer allowable retreating distance Llim provides the longer turning radius Rb compared with the shorter allowable retreating distance Llim (more specifically, such that the turning radius Rb increases with an increase in the allowable retreating distance Llim). The turning radius Ra of the right front wheel 22a is set to an absolute value of a difference (Rb−W) obtained by subtracting the tread W from the turning radius Rb of the left front wheel 22b. FIG. 8 is a diagram illustrating one example of the relationship of the turning radius Ra of the right front wheel 22a and the turning radius Rb of the left front wheel 22b to the tread W. In FIG. 8, "P2" indicates a position on the straight line A1 that is away from the centers of the right front wheel 22a and the left front wheel 22b respectively by the turning radius Ra and by the turning radius Rb. The turning radius Rb of the left front wheel 22b is longer than the tread W, so that the position P2 is on the right side of the vehicle (on the right side of the right front wheel 22a in FIG. 8).

The lock protection control subsequently performs a third turning process that decreases the driving forces Fma and Fmb of the motor for right front wheel 32a and the motor for left front wheel 32b, so as to satisfy the relationship of "dθea<0, dθeb<0, Ra:Rb (Ra<Rb)=|dθea|:|dθeb|" with regard to the variations dθea and dθeb per unit time in the electric angles θea and θeb of the motor for right front wheel 32a and the motor for left front wheel 32b (step S230). The third turning process is performed to satisfy the relationship of "|dθea|<|dθeb|=dθe2*". The value dθe2* used here is preferably a value of such a level that does not provide the driver with a feeling of strangeness.

After performing the third turning process, the lock protection control determines whether the phase in which electric current is flowed in a concentrated manner in the motor for right front wheel 32a and the motor for left front wheel 32b has been changed over by the third turning process (step S240). This determination may be based on, for example, determining whether an absolute value of a total variation SΘea3 of the electric angle θea of the motor for right front wheel 32a since the start of the third turning process becomes equal to or higher than the above reference value SΘeref. In the third turning process, because of "|dθea|<|dθeb|", when the absolute value of the total variation SΘea3 of the electric angle θea of the motor for right front wheel 32a since the start of the third turning process becomes equal to or higher than the reference value SΘeref, an absolute value of a total variation SΘeb3 of the electric angle θeb of the motor for left front wheel 32b since the start of the third turning process naturally becomes equal to or higher than the above reference value SΘeref. When it is determined that the phase in which electric current is flowed in a concentrated manner in the motor for right front wheel 32a and the motor for left front wheel 32b has not been changed over yet, the lock protection control returns to step S230. The processing of steps S230 and S240 is repeatedly performed (i.e., the third turning process is continued) until it is determined at step S240 that the phase in which electric current is flowed in a concentrated manner in the motor for right front wheel 32a and the motor for left front wheel 32b has been changed over.

Figure 9:
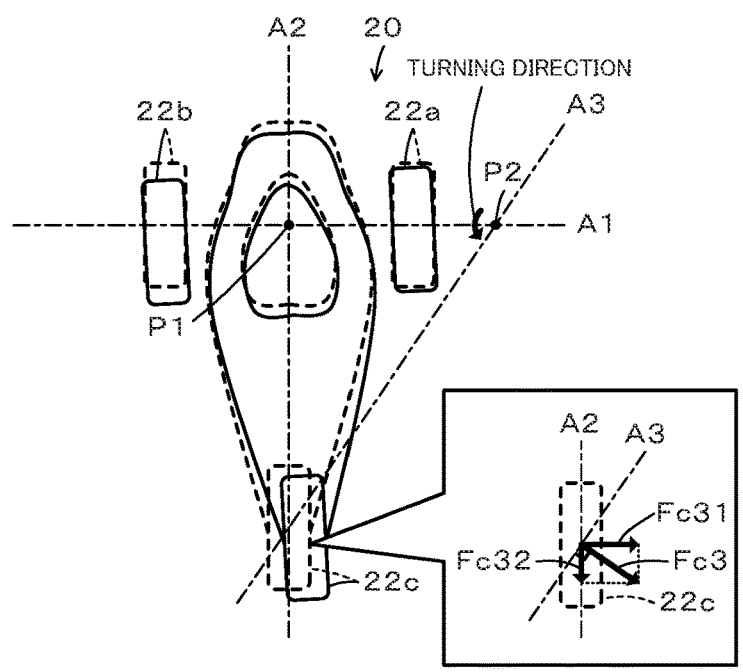
FIG. 9 is a diagram illustrating one example of the state of vehicle turning by a third turning process.

FIG. 9 is a diagram illustrating one example of the state of vehicle turning by the third turning process. In FIG. 9, broken lines show the state prior to turning of the vehicle, and solid lines show the state of vehicle turning. In FIG. 9, a "thick curved arrow" indicates the turning direction of the vehicle, and "A3" denotes a straight line passing through the position P2 and the center of the rear wheel 22c. "Thick straight arrows" in an enlarged view of FIG. 9 (enlarged view of the rear wheel 22c prior to turning of the vehicle) indicate a force Fc3 that is a force applied to the rear wheel 22c other than the retreating force Fgc described above during turning of the vehicle by the third turning process, as well as its component forces Fc31 and Fc32. The third turning process rotates the electric angles θea and θeb of the motor for right front wheel 32a and the motor for left front wheel 32b toward the negative side (rearward) by rotation amounts of the respective absolute values corresponding to the ratio of the turning radius Ra and the turning radius Rb. This accordingly rotates the right front wheel 22a and the left front wheel 22b toward the negative side (rearward) by rotation amounts of the respective absolute values corresponding to the ratio of the turning radius Ra and the turning radius Rb. Accordingly the vehicle is turned counterclockwise about the position P2 as the center of turning as shown in FIG. 9. This changes over the phase in which electric current is flowed in a concentrated manner in the motor for right front wheel 32a and the motor for left front wheel 32b and thereby suppresses a temperature rise in the motor for right front wheel 32a and the motor for left front wheel 32b and in the inverters 34a and 34b, while reducing the retreating distance of the vehicle (i.e., the moving distance to right behind) compared with lock protection control that moves the vehicle straight back. As a result, this configuration enables the lock protection control to be performed even in the case of a relatively short allowable retreating distance Llim (in the case where an object is present behind the vehicle). This retreating distance of the vehicle is slightly longer than the retreating distance when the vehicle is turned about the above position P1 as the center of turning.

During turning of the vehicle by the third turning process, the rear wheel 22c is dragged by the force Fc3 that acts in a direction perpendicular to the straight line A3 (i.e., toward lower right of FIG. 9). At the steering angle θst equal to the value 0, whereas the force Fc1 described above (shown in FIG. 6) is the force acting in the direction perpendicular to the direction of the rear wheel 22c, this force Fc3 (shown in FIG. 9) may be regarded as the sum of the component force Fc31 in the direction of the rear wheel 22c and the component force Fc32 in the direction perpendicular to the direction of the rear wheel 22c. When the magnitude of the force Fc1 described above is equal to the magnitude of this force Fc3, the component force Fc32 of the force Fc3 is smaller than the force Fc1. This accordingly decreases the frictional force applied between the rear wheel 22c and the road surface (i.e., the force of dragging the rear wheel 22c) and thereby suppresses wear of the rear wheel 22c.

The lock protection control of turning the vehicle about the position P2 as the center of turning slightly increases the retreating distance of the vehicle compared with the lock protection control of turning the vehicle about the position P1 as the center of turning, but suppresses wear of the rear wheel 22c. An increase in distance of the position P2 from the vehicle more effectively suppresses wear of the rear wheel 22c, while increasing the retreating distance of the vehicle. Setting the position P2 based on the allowable retreating distance Llim thus more appropriately balances the retreating distance of the vehicle with suppression of wear of the rear wheel 22c.

When it is determined at step S240 that the phase in which electric current is flowed in a concentrated manner in the motor for right front wheel 32a and the motor for left front wheel 32b has been changed over, the lock protection control performs a third rotation stop process that increases the driving forces Fma and Fmb of the motor for right front wheel 32a and the motor for left front wheel 32b, so as to stop rotation of the motor for right front wheel 32a and the motor for left front wheel 32b (step S250).

The lock protection control subsequently performs a fourth turning process that increases the driving forces Fma and Fmb of the motor for right front wheel 32a and the motor for left front wheel 32b, so as to satisfy the relationship of "dθea>0, dθeb>0, Ra:Rb (Ra<Rb)=|dθea|:|dθeb|" with regard to the variations dθea and dθeb per unit time in the electric angles θea and θeb of the motor for right front wheel 32a and the motor for left front wheel 32b (step S260). According to this modification, like the third turning process, the fourth turning process is performed to satisfy the relationship of "|dθea|<|dθeb|=dθe2*".

After performing the fourth turning process, the lock protection control determines whether the phase in which electric current is flowed in a concentrated manner in the motor for right front wheel 32a and the motor for left front wheel 32b has been changed over by the fourth turning process (step S270). This determination may be based on, for example, determining whether an absolute value of a total variation Sθea4 of the electric angle θea of the motor for right front wheel 32a since the start of the fourth turning process becomes equal to or higher than the above reference value Sθeref. In the fourth turning process, because of "|dθea|<|dθeb|", when the absolute value of the total variation Sθea4 of the electric angle θea of the motor for right front wheel 32a since the start of the fourth turning process becomes equal to or higher than the reference value Sθeref, an absolute value of a total variation Sθeb4 of the electric angle θeb of the motor for left front wheel 32b since the start of the fourth turning process naturally becomes equal to or higher than the reference value Sθeref. When it is determined that the phase in which electric current is flowed in a concentrated manner in the motor for right front wheel 32a and the motor for left front wheel 32b has not been changed over yet, the lock protection control returns to step S260. The processing of steps S260 and S270 is repeatedly performed (i.e., the fourth turning process is continued) until it is determined at step S270 that the phase in which electric current is flowed in a concentrated manner in the motor for right front wheel 32a and the motor for left front wheel 32b has been changed over.

The fourth turning process rotates the electric angles θea and θeb of the motor for right front wheel 32a and the motor for left front wheel 32b toward the positive side (forward) by rotation amounts of the respective absolute values corresponding to the ratio of the turning radius Ra and the turning radius Rb. This accordingly rotates the right front wheel 22a and the left front wheel 22b toward the positive side (forward) by rotation amounts of the respective absolute values corresponding to the ratio of the turning radius Ra and the turning radius Rb. Accordingly the vehicle is turned clockwise of FIG. 9 about the above position P2 as the center of turning. This changes over the phase in which electric current is flowed in a concentrated manner in the motor for right front wheel 32a and the motor for left front wheel 32b and thereby suppresses a temperature rise in the motor for right front wheel 32a and the motor for left front wheel 32b and in the inverters 34a and 34b. During turning of the vehicle by the fourth turning process, the rear wheel 22c is dragged by a force Fc4 that acts in an opposite direction to that of the force Fc3 described above.

As described above, according to this modification, when it is determined that the motor for right front wheel 32a and the motor for left front wheel 32b are in the locked state (before a start of the lock protection control), it is assumed that the steering angle θst is equal to the value 0 and the direction of the right front wheel 22a, the left front wheel 22b and the rear wheel 22c is identical with the gradient direction of the uphill road, i.e., all the angles φa, φb and φc in Equations (1) to (3) given above are equal to the value 0. In this state, turning the vehicle counterclockwise of FIG. 9 about the position P2 as the center of turning by the third turning process of the lock protection control increases the absolute values of the angles φa, φb and φc and decreases the absolute values of the retreating forces Fga, Fgb and Fgc of the right front wheel 22a, the left front wheel 22b and the rear wheel 22c. The driving forces Fma and Fmb of the motor for right front wheel 32a and the motor for left front wheel 32b that are required to cause the vehicle to move forward (climb the uphill road) with turning in the fourth turning process of the lock protection control are accordingly smaller than the driving forces Fma and Fmb of the motor for right front wheel 32a and the motor for left front wheel 32b that are required to cause the vehicle to move straight forward (climb straight the uphill road) when the steering angle θst is equal to the value 0 and the direction of the right front wheel 22a, the left front wheel 22b and the rear wheel 22c is identical with the gradient direction of the uphill road. This configuration accordingly further expands the range of the road surface gradient θrd in which the lock protection control is executable.

When it is determined at step S270 that the phase in which electric current is flowed in a concentrated manner in the motor for right front wheel 32a and the motor for left front wheel 32b has been changed over, the lock protection control performs a fourth rotation stop process that decreases the driving forces Fma and Fmb of the motor for right front wheel 32a and the motor for left front wheel 32b, so as to stop rotation of the motor for right front wheel 32a and the motor for left front wheel 32b (step S280) and terminates the lock protection control and then this routine. As described above, performing the fourth turning process and the fourth rotation stop process after the third turning process and the third rotation stop process suppresses a significant shift in position of the vehicle between the start time and the end time of the lock protection control.

When it is determined that the motor for right front wheel 32a and the motor for left front wheel 32b are in the locked state, the forward hill-climbing control routine of FIG. 7 performs the lock protection control to turn the vehicle counterclockwise of FIG. 9 about the vehicle right-side position P2 on the straight line A1 as the center of turning and then turn the vehicle clockwise of FIG. 9 about the same position P2 as the center of turning. According to a modification, the lock protection control may be performed to turn the vehicle clockwise of FIG. 9 about a vehicle right-side position P2' on the straight line A1 as the center of turning and then turn the vehicle counterclockwise of FIG. 9 about the same position P2' as the center of turning.

Figure 10:
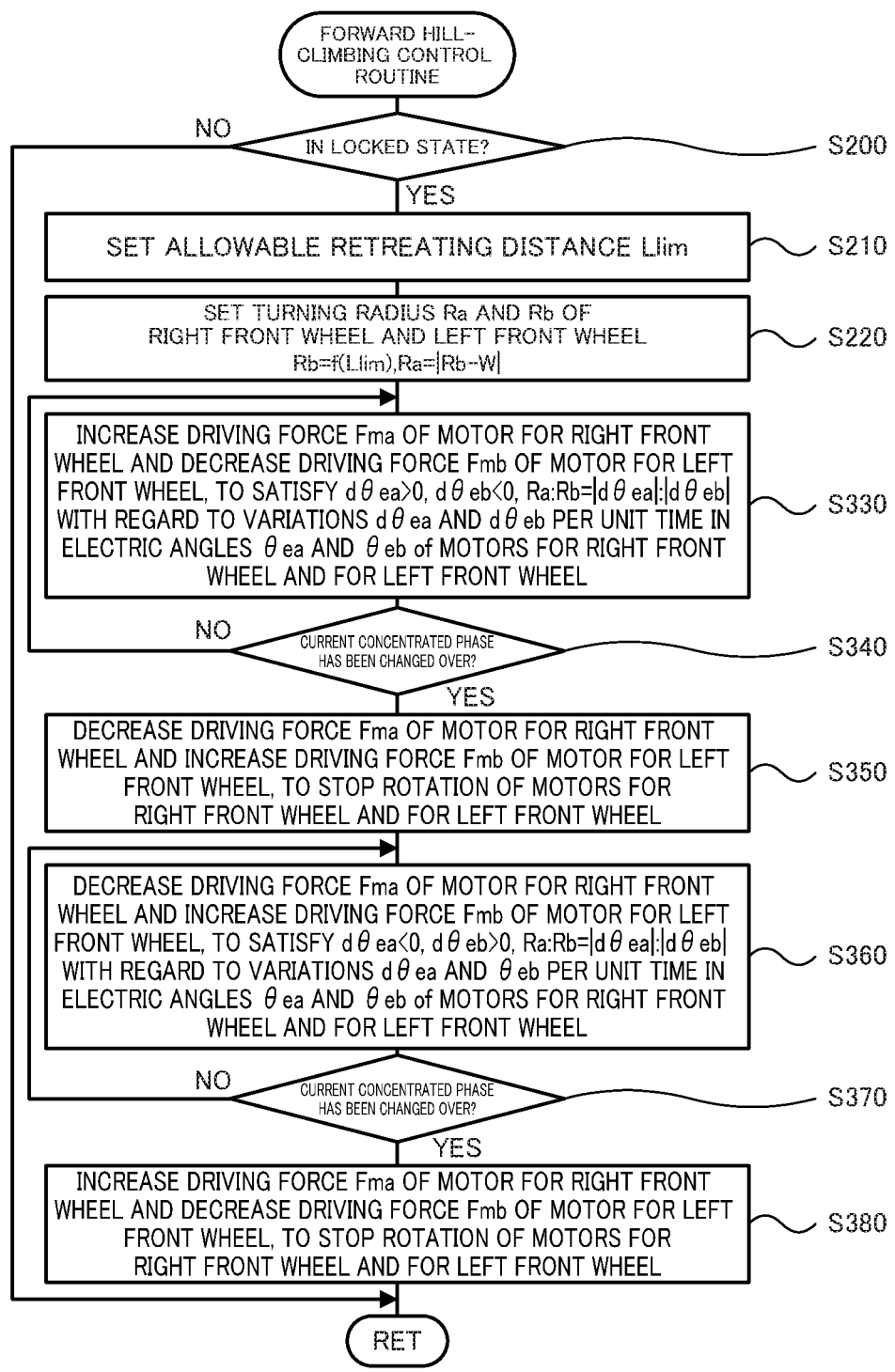
FIG. 10 is a flowchart showing one example of the forward hill-climbing control routine according to another modification.
Figure 11:
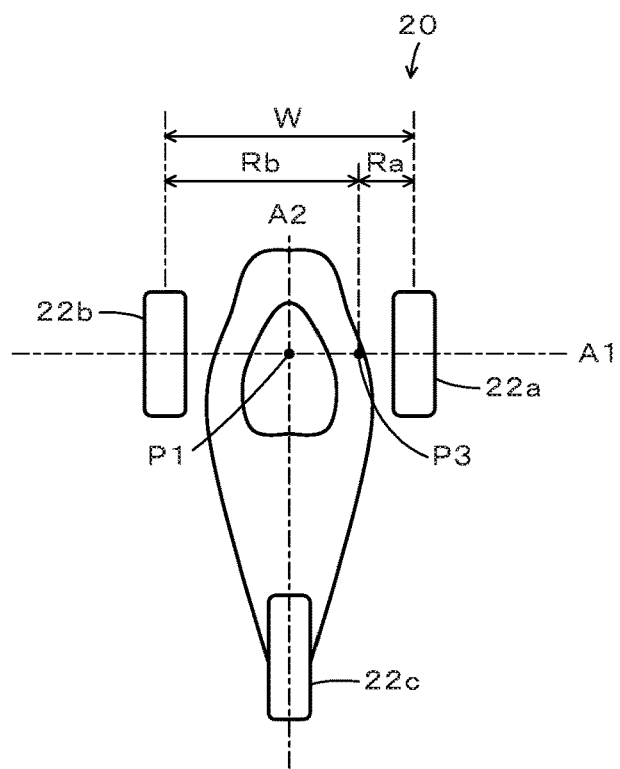
FIG. 11 is a diagram illustrating another example of the relationship of the turning radius Ra of the right front wheel and the turning radius Rb of the left front wheel to the tread W.

In the forward hill-climbing control routine of FIG. 7, the turning radius Rb of the left front wheel 22b is set in the range that is longer than the tread W. The turning radius Rb may, however, be set in a range that is shorter than the tread W and that is longer than half the tread W. FIG. 10 is a flowchart showing one example of the forward hill-climbing control routine according to this modification. FIG. 11 is a diagram illustrating another example of the relationship of the turning radius Ra of the right front wheel 22a and the turning radius Rb of the left front wheel 22b to the tread W. In FIG. 11, "P3" indicates a position on the straight line A1 that is away from the centers of the right front wheel 22a and the left front wheel 22b respectively by the turning radius Ra and by the turning radius Rb. The turning radius Rb of the left front wheel 22b is shorter than the tread W and is longer than half the tread W, so that the position P3 is located between the above position P1 and the center of the right front wheel 22a. The routine of FIG. 10 is similar to the routine of FIG. 7 except the processing of steps S330 to S380 performed in place of the processing of steps S230 to S280. The like processing steps are expressed by the like step numbers, and their detailed description is omitted.

In the forward hill-climbing control routine of FIG. 10, like the forward hill-climbing control routine of FIG. 7, the lock protection control first sets the allowable retreating distance Llim of the vehicle (step S210) and subsequently sets the turning radius Ra of the right front wheel 22a and the turning radius Rb of the left front wheel 22b (step S220). The lock protection control subsequently performs a fifth turning process that increases the driving force Fma of the motor for right front wheel 32a and decreases the driving force Fmb of the motor for left front wheel 32b, so as to satisfy the relationship of "dθea<0, dθeb<0, Ra:Rb (Ra<Rb) =|dθea|:|dθeb|" with regard to the variations dθea and dθeb per unit time in the electric angles θea and θeb of the motor for right front wheel 32a and the motor for left front wheel 32b (step S330). The fifth turning process is performed to satisfy the relationship of "|dθea|<|dθeb|=dθe3*". The value dθe3* used here is preferably a value of such a level that does not provide the driver with a feeling of strangeness.

After performing the fifth turning process, the lock protection control determines whether the phase in which electric current is flowed in a concentrated manner in the motor for right front wheel 32a and the motor for left front wheel 32b has been changed over by the fifth turning process (step S340). This determination may be based on, for example, determining whether an absolute value of a total variation Sθea5 of the electric angle θea of the motor for right front wheel 32a since the start of the fifth turning process becomes equal to or higher than the above reference value Sθeref. In the fifth turning process, because of "|dθea|<|dθeb|", when the absolute value of the total variation Sθea5 of the electric angle θea of the motor for right front wheel 32a since the start of the fifth turning process becomes equal to or higher than the reference value Sθeref, an absolute value of a total variation Sθeb5 of the electric angle θeb of the motor for left front wheel 32b since the start of the fifth turning process naturally becomes equal to or higher than the above reference value Sθeref. When it is determined that the phase in which electric current is flowed in a concentrated manner in the motor for right front wheel 32a and the motor for left front wheel 32b has not been changed over yet, the lock protection control returns to step S330. The processing of steps S330 and S340 is repeatedly performed (i.e., the fifth turning process is continued) until it is determined at step S340 that the phase in which electric current is flowed in a concentrated manner in the motor for right front wheel 32a and the motor for left front wheel 32b has been changed over.

Figure 12:
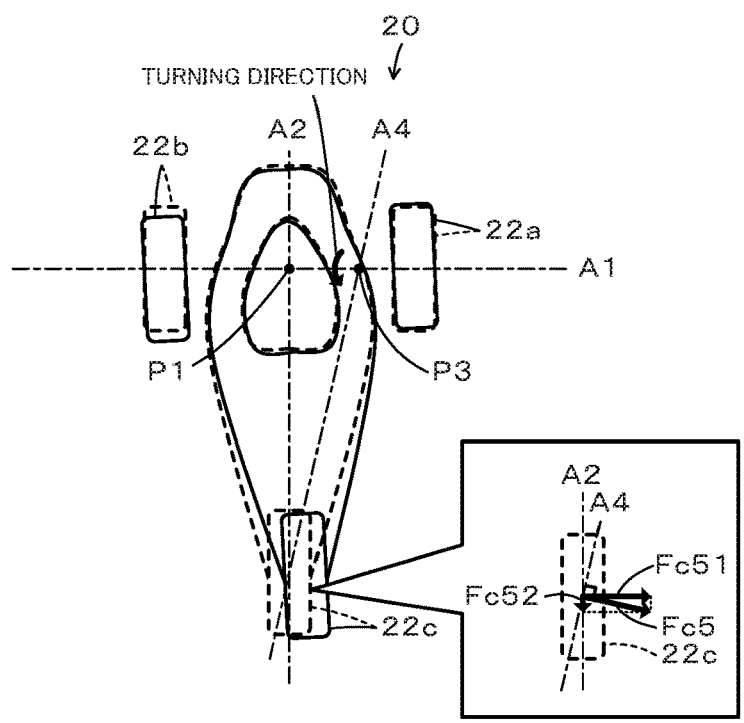
FIG. 12 is a diagram illustrating one example of the state of vehicle turning by a fifth turning process.

FIG. 12 is a diagram illustrating one example of the state of vehicle turning by the fifth turning process. In FIG. 12, broken lines show the state prior to turning of the vehicle, and solid lines show the state of vehicle turning. In FIG. 12, a "thick curved arrow" indicates the turning direction of the vehicle, and "A4" denotes a straight line passing through the position P3 and the center of the rear wheel 22c. "Thick straight arrows" in an enlarged view of FIG. 12 (enlarged view of the rear wheel 22c prior to turning of the vehicle) indicate a force Fc5 that is a force applied to the rear wheel 22c other than the retreating force Fgc described above during turning of the vehicle by the fifth turning process, as well as its component forces Fc51 and Fc52. The fifth turning process rotates the electric angle θea of the motor for right front wheel 32a toward the positive side (forward) and the electric angle θeb of the motor for left front wheel 32b toward the negative side (rearward) by rotation amounts of the respective absolute values corresponding to the ratio of the turning radius Ra and the turning radius Rb. This accordingly rotates the right front wheel 22a toward the positive side (forward) and the left front wheel 22b toward the negative side (rearward) by rotation amounts of the respective absolute values corresponding to the ratio of the turning radius Ra and the turning radius Rb. Accordingly the vehicle is turned counterclockwise about the position P3 as the center of turning as shown in FIG. 12. This changes over the phase in which electric current is flowed in a concentrated manner in the motor for right front wheel 32a and the motor for left front wheel 32b and thereby suppresses a temperature rise in the motor for right front wheel 32a and the motor for left front wheel 32b and in the inverters 34a and 34b, while reducing the retreating distance of the vehicle (i.e., the moving distance to right behind) compared with lock protection control that moves the vehicle straight back. As a result, this configuration enables the lock protection control to be performed even in the case of a relatively short allowable retreating distance Llim (in the case where an object is present behind the vehicle). This retreating distance of the vehicle is slightly longer than the retreating distance when the vehicle is turned about the above position P1 as the center of turning and is slightly shorter than the retreating distance when the vehicle is turned about the above position P2 as the center of turning.

During turning of the vehicle by the fifth turning process, the rear wheel 22c is dragged by the force Fc5 that acts in a direction perpendicular to the straight line A4 (i.e., toward lower right of FIG. 12). At the steering angle θst equal to the value 0, like the force Fc3 described above, this force Fc5 may be regarded as the sum of the component force Fc51 in the direction of the rear wheel 22c and the component force Fc52 in the direction perpendicular to the direction of the rear wheel 22c. When the magnitude of the force Fc1 described above is equal to the magnitude of this force Fc5, the component force Fc52 of the force Fc5 is smaller than the force Fc1. This accordingly decreases the frictional force applied between the rear wheel 22c and the road surface (i.e., the force of dragging the rear wheel 22c) and thereby suppresses wear of the rear wheel 22c.

The lock protection control of turning the vehicle about the position P3 as the center of turning slightly increases the retreating distance of the vehicle compared with the lock protection control of turning the vehicle about the position P1 as the center of turning, but suppresses wear of the rear wheel 22c. An increase in distance of the position P3 from the position P1 more effectively suppresses wear of the rear wheel 22c, while increasing the retreating distance of the vehicle. Setting the position P3 based on the allowable retreating distance Llim thus more appropriately balances the retreating distance of the vehicle with suppression of wear of the rear wheel 22c.

When it is determined at step S340 that the phase in which electric current is flowed in a concentrated manner in the motor for right front wheel 32a and the motor for left front wheel 32b has been changed over, the lock protection control performs a fifth rotation stop process that decreases the driving force Fma of the motor for right front wheel 32a and increases the driving force Fmb of the motor for left front wheel 32b, so as to stop rotation of the motor for right front wheel 32a and the motor for left front wheel 32b (step S350).

The lock protection control subsequently performs a sixth turning process that decreases the driving force Fma of the motor for right front wheel 32a and increases the driving force Fmb of the motor for left front wheel 32b, so as to satisfy the relationship of "dθea>0, dθeb>0, Ra:Rb (Ra<Rb) =|dθea|:|dθeb|" with regard to the variations dθea and dθeb per unit time in the electric angles θea and θeb of the motor for right front wheel 32a and the motor for left front wheel 32b (step S360). According to this modification, like the fifth turning process, the sixth turning process is performed to satisfy the relationship of "|dθea|<|dθeb|=dθe3*".

After performing the sixth turning process, the lock protection control determines whether the phase in which electric current is flowed in a concentrated manner in the motor for right front wheel 32a and the motor for left front wheel 32b has been changed over by the sixth turning process (step S370). This determination may be based on, for example, determining whether an absolute value of a total variation Sθea6 of the electric angle θea of the motor for right front wheel 32a since the start of the sixth turning process becomes equal to or higher than the above reference value Sθeref. In the sixth turning process, because of "Ra<Rb" and "|dθea|<|dθeb|", when the absolute value of the total variation Sθea6 of the electric angle θea of the motor for right front wheel 32a since the start of the sixth turning process becomes equal to or higher than the reference value Sθeref, an absolute value of a total variation Sθeb6 of the electric angle θeb of the motor for left front wheel 32b since the start of the sixth turning process naturally becomes equal to or higher than the reference value Sθeref. When it is determined that the phase in which electric current is flowed in a concentrated manner in the motor for right front wheel 32a and the motor for left front wheel 32b has not been changed over yet, the lock protection control returns to step S360. The processing of steps S360 and S370 is repeatedly performed (i.e., the sixth turning process is continued) until it is determined at step S370 that the phase in which electric current is flowed in a concentrated manner in the motor for right front wheel 32a and the motor for left front wheel 32b has been changed over.

The sixth turning process rotates the electric angle θea of the motor for right front wheel 32a toward the negative side (rearward) and the electric angle θeb of the motor for left front wheel 32b toward the positive side (forward) by rotation amounts of the respective absolute values corresponding to the ratio of the turning radius Ra and the turning radius Rb. This accordingly rotates the right front wheel 22a toward the negative side (rearward) and the left front wheel 22b toward the positive side (forward) by rotation amounts of the respective absolute values corresponding to the ratio of the turning radius Ra and the turning radius Rb. Accordingly the vehicle is turned clockwise of FIG. 12 about the position P3 as the center of turning. This changes over the phase in which electric current is flowed in a concentrated manner in the motor for right front wheel 32a and the motor for left front wheel 32b and thereby suppresses a temperature rise in the motor for right front wheel 32a and the motor for left front wheel 32b and in the inverters 34a and 34b. During turning of the vehicle by the sixth turning process, the rear wheel 22c is dragged by a force Fc6 that acts in an opposite direction to that of the force Fc5 described above.

When it is determined at step S370 that the phase in which electric current is flowed in a concentrated manner in the motor for right front wheel 32a and the motor for left front wheel 32b has been changed over, the lock protection control performs a sixth rotation stop process that decreases the driving forces Fma and Fmb of the motor for right front wheel 32a and the motor for left front wheel 32b, so as to stop rotation of the motor for right front wheel 32a and the motor for left front wheel 32b (step S380) and terminates the lock protection control and then this routine. As described above, performing the sixth turning process and the sixth rotation stop process after the fifth turning process and the fifth rotation stop process suppresses a significant shift in position of the vehicle between the start time and the end time of the lock protection control.

When it is determined that the motor for right front wheel 32a and the motor for left front wheel 32b are in the locked state, the forward hill-climbing control routine of FIG. 10 performs the lock protection control to turn the vehicle counterclockwise of FIG. 12 about the P3 on the straight line A1 between the above position P1 and the center of the right front wheel 22a as the center of turning and then turn the vehicle clockwise of FIG. 12 about the same position P3 as the center of turning. According to a modification, the lock protection control may be performed to turn the vehicle clockwise of FIG. 12 about a position P3' on the straight line A1 between the above position P1 and the center of the left front wheel 22b as the center of turning and then turn the vehicle counterclockwise of FIG. 12 about the same position P3' as the center of turning.

In the forward hill-climbing control routine of FIG. 7 or FIG. 10, the lock protection control sets the turning radius Ra of the right front wheel 22a and the turning radius Rb of the left front wheel 22b, based on the allowable retreating distance Llim. According to a modification, the turning radius Ra of the right front wheel 22a and the turning radius Rb of the left front wheel 22b may be set using the allowable retreating distance Llim that is a fixed value. In other words, the turning radius Ra of the right front wheel 22a and the turning radius Rb of the left front wheel 22b may be respectively fixed values.

In the electric vehicle 20 of the embodiment and its modifications, as described with reference to the forward hill-climbing control routine of FIG. 2, FIG. 7 or FIG. 10, the lock protection control rotates the motor for right front wheel 32a and the motor for left front wheel 32b such that the vehicle is turned toward one side about the center of turning (for example, the position P1, the position P2 or the position P3) (i.e., performs the first turning process, the third turning process or the fifth turning process) and subsequently rotates the motor for right front wheel 32a and the motor for left front wheel 32b such that the vehicle is turned toward the other side about the center of turning (i.e., subsequently performs the second turning process, the fourth turning process or the sixth turning process). According to a modification, however, the lock protection control may rotate the motor for right front wheel 32a and the motor for left front wheel 32b such that the vehicle is turned toward one side about the center of turning but may not subsequently rotate the motor for right front wheel 32a and the motor for left front wheel 32b such that the vehicle is turned toward the other side about the center of turning.

In the electric vehicle 20 of the embodiment and its modifications, the lock protection control is performed when the steering angle θst is equal to the value 0. Even when the steering angle θst is not equal to the value 0, however, the lock protection control may similarly be performed to rotate the motor for right front wheel 32a and the motor for left front wheel 32b and thereby turn the vehicle.

In the electric vehicle 20 of the embodiment and its modifications, as described with reference to the forward hill-climbing control routine of FIG. 2, FIG. 7 or FIG. 10, the lock protection control may be performed when the vehicle climbs an uphill road. The lock protection control may, however, be also performed when the vehicle moves forward to ride over a level difference such as curbstone.

Figure 13:
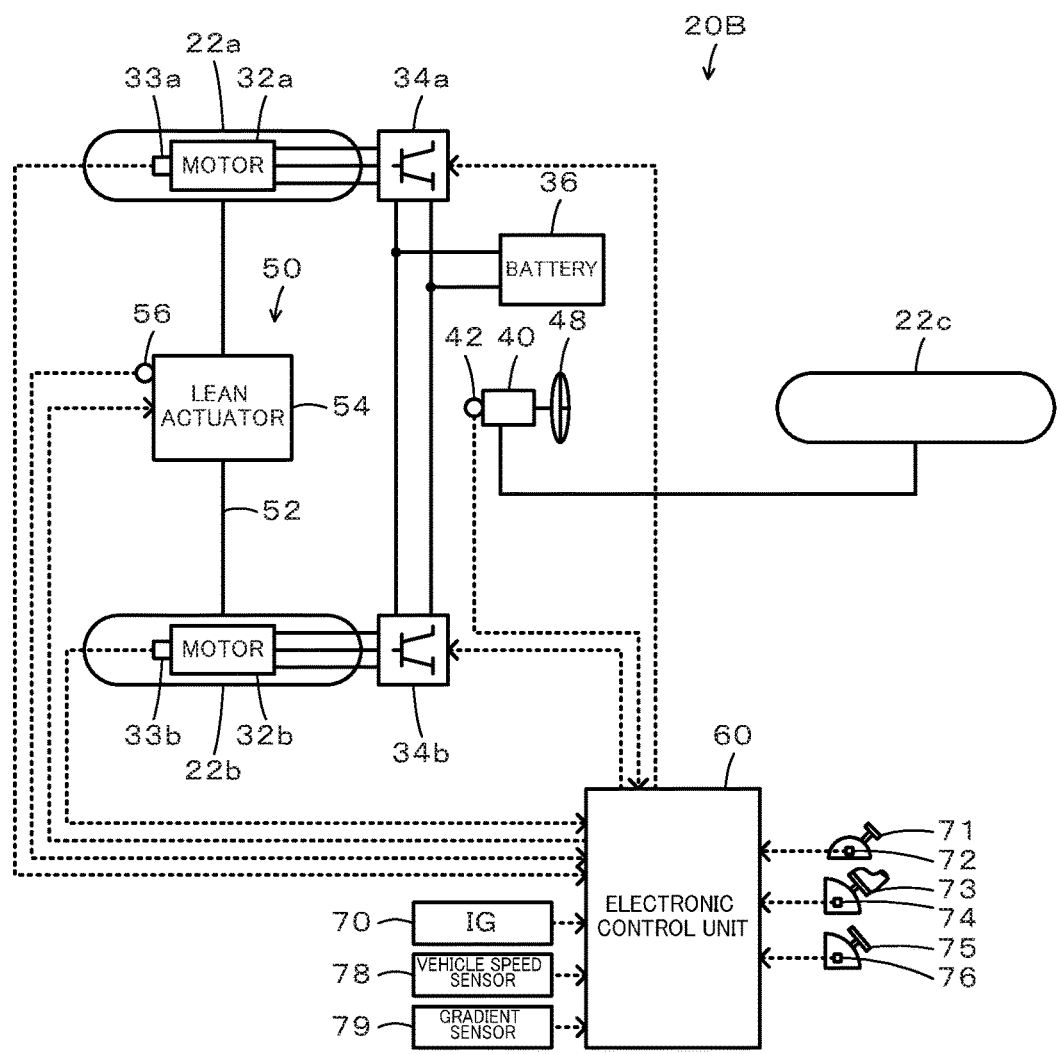
FIG. 13 is a configuration diagram illustrating the schematic configuration of an electric vehicle according to a modification.

The electric vehicle 20 of the embodiment is provided with the motor for right front wheel 32a and the motor for left front wheel 32b, the inverters 34a and 34b, the battery 36 and the steering device 40. As illustrated in FIG. 13, an electric vehicle 20B according to a modification may include a lean device 50, in addition to the components of the electric vehicle 20. The lean device 50 includes a lean mechanism 52 mounted to the vehicle body, the right front wheel 22a and the left front wheel 22b and configured to incline the vehicle body in the vehicle left-right direction (in the vehicle width direction) by lifting up one of the right front wheel 22a and the left front wheel 22b relative to the vehicle body while pressing down the other, and a lean actuator 54 configured to drive the lean mechanism 52. A lean angle θL from a lean angle sensor 56 configured to detect the lean angle as an inclination angle of the vehicle body by the lean device 50 is input into the electronic control unit 60 via the input port. The electronic control unit 60 outputs control signals to the lean actuator 54 via the output port. When the above drive control is performed, the electronic control unit 60 controls the lean actuator 54 of the lean device 50 to incline the vehicle body to the inner wheel side based on the steering angle θst during turning, in addition to controlling the inverters 34a and 34b. In the configuration provided with this lean device 50, the tread W differs according to the lean angle θL. In the lock protection control of the forward hill-climbing control routine of FIG. 7 or FIG. 10, it is preferable to use the tread W according to the lean angle θL for the process of step S220.

The electric vehicle 20 includes the battery 36 as the power storage device according to the above embodiment but may include a capacitor as the power storage device.

The electric vehicle 20 of the embodiment is configured as the three-wheeled vehicle that is provided with the right front wheel 22a and the left front wheel 22b respectively driven by the motor for right front wheel 32a and the motor for left front wheel 32b and with the rear wheel 22c as one steering wheel. According to a modification, the electric vehicle may be configured as a three-wheeled vehicle that is provided with a front wheel as one steering wheel and with left and right rear wheels respectively driven by two motors. According to another modification, the electric vehicle may be configured as a three-wheeled vehicle that is provided with left and right front wheels as two steering wheels respectively driven by two motors and with a rear wheel as one driven wheel. According to yet another modification, the electric vehicle may be configured as a three-wheeled vehicle that is provided with a front wheel as one driven wheel and with left and right rear wheels as two steering wheels respectively driven by two motors.

The electric vehicle 20 of the embodiment is configured as the three-wheeled vehicle that is provided with the right front wheel 22a, the left front wheel 22b and the rear wheel 22c. According to a modification, the electric vehicle may be configured as a four-wheeled vehicle that is provided with left and right front wheels and left and right rear wheels.

According to one aspect of the vehicle of the present disclosure, the control device may perform the lock protection control that rotates the two motors by different rotation amounts. This configuration causes the lock protection control to rotate the two motors by different rotation amounts, such that the vehicle is turned.

In the above aspect of the vehicle of the present disclosure configured to perform the lock protection control that rotates the two motors by different rotation amounts, the control device may perform the lock protection control that rotates the two motors by different rotation amounts, such that the vehicle is turned about, as a center of turning, a predetermined position on a first straight line that passes through the left and right drive wheels in a vehicle left-right direction (i.e., in a vehicle width direction). This lock protection control of turning the vehicle about the predetermined position as the center of turning reduces the retreating distance of the vehicle, compared with the lock protection control of moving the vehicle straight back.

In the above aspect of the vehicle of the present disclosure configured to perform the lock protection control that rotates the two motors by different rotation amounts such that the vehicle is turned about the predetermined position as the center of turning, the predetermined position may be position of an intersection of the first straight line with a second straight line that passes through the center of the vehicle left-right direction (i.e., the vehicle width direction in a vehicle longitudinal direction. The control device may perform the lock protection control that rotates the two motors by rotation amounts in opposite directions having identical absolute values. This configuration further reduces the retreating distance of the vehicle.

In the above aspect of the vehicle of the present disclosure configured to perform the lock protection control that rotates the two motors by different rotation amounts such that the vehicle is turned about the predetermined position as the center of turning, for example, the predetermined position may be a position on the first straight line and outside of the vehicle. The control device may perform the lock protection control that rotates the two motors by rotation amounts in an identical direction having absolute values corresponding to a ratio of distances respectively from the left drive wheel and the right drive wheel to the predetermined position. In another example, the predetermined position may be a position between one of the left and right drive wheels and an intersection of the first straight line with a second straight line that passes through the center of the vehicle left-right direction (i.e., the vehicle width direction) in a vehicle longitudinal direction. The control device may perform the lock protection control that rotates the two motors by rotation amounts in opposite directions having absolute values corresponding to a ratio of distances respectively from the left drive wheel and the right drive wheel to the predetermined distance. These configurations suppress an increase in a force in a direction perpendicular to the direction of the driven wheel (i.e., a force of dragging the driven wheel) that is applied to the driven wheel located at a different position from the left and right drive wheels in the vehicle longitudinal direction, compared with the lock protection control of turning the vehicle about the position of the intersection of the first straight line with the second straight line as the center of turning described above. This results in suppressing wear of the driven wheel.

In another aspect of the vehicle of the present disclosure, the control device may perform the lock protection control that rotates the two motors such that the vehicle is turned toward one side about a center of turning and subsequently rotates the two motors such that the vehicle is turned toward the other side about the center of turning. This configuration suppresses a significant shift in position of the vehicle between the start time and the end time of the lock protection control.

The following describes the correspondence relationship between the primary elements of the above embodiment and the primary elements of the disclosure described in Summary. The motor for right front wheel 32a and the motor for left front wheel 32b of the embodiment correspond to the "two motors", and the inverters 34a and 34b correspond to the "two inverters". The battery 36 corresponds to the "power storage device", and the electronic control unit 60 corresponds to the "control device".

The correspondence relationship between the primary components of the embodiment and the primary components of the present disclosure, regarding which the problem is described in Summary, should not be considered to limit the components of the present disclosure, regarding which the problem is described in Summary, since the embodiment is only illustrative to specifically describes the aspects of the present disclosure, regarding which the problem is described in Summary. In other words, the present disclosure, regarding which the problem is described in Summary, should be interpreted on the basis of the description in Summary, and the embodiment is only a specific example of the present disclosure, regarding which the problem is described in Summary.

The aspect of the present disclosure is described above with reference to the embodiment. The present disclosure is, however, not limited to the above embodiment but various modifications and variations may be made to the embodiment without departing from the scope of the present disclosure.

INDUSTRIAL APPLICABILITY

The present disclosure is applicable to, for example, the manufacturing industries of vehicles.

The invention claimed is:
1. A vehicle, comprising:
two motors configured to respectively drive left and right drive wheels;
two inverters configured to respectively drive the two motors;
a power storage device configured to transmit electric power to and from the two motors via the two inverters; and
a control device configured to perform a lock protection control that rotates the two motors to change over a phase in which electric current is flowed in a concentrated manner in the two motors, when the two motors are in a locked state in which electric current is flowed in a concentrated manner in a specific phase in the two motors, wherein
the control device performs the lock protection control that rotates the two motors such that the vehicle is turned.

2. The vehicle according to claim 1,
wherein the control device performs the lock protection control that rotates the two motors by different rotation amounts.

3. The vehicle according to claim 2,
wherein the control device performs the lock protection control that rotates the two motors by different rotation amounts such that the vehicle is turned about, as a center of turning, a predetermined position on a first straight line that passes through the left and right drive wheels in a vehicle left-right direction.

4. The vehicle according to claim 3,
wherein the predetermined position is position of an intersection of the first straight line with a second straight line that passes through a center of the vehicle left-right direction in a vehicle longitudinal direction, and
the control device performs the lock protection control that rotates the two motors by rotation amounts in opposite directions having identical absolute values.

5. The vehicle according to claim 3,
wherein the predetermined position is a position on the first straight line and outside of the vehicle, and
the control device performs the lock protection control that rotates the two motors by rotation amounts in an identical direction having absolute values corresponding to a ratio of distances respectively from the left drive wheel and the right drive wheel to the predetermined position.

6. The vehicle according to claim 3,
wherein the predetermined position is a position between one of the left and right drive wheels and an intersection of the first straight line with a second straight line that passes through a center of the vehicle left-right direction in a vehicle longitudinal direction, and
the control device performs the lock protection control that rotates the two motors by rotation amounts in different directions having absolute values corresponding to a ratio of distances respectively from the left drive wheel and the right drive wheel to the predetermined position.

7. The vehicle according to claim 1,
wherein the control device performs the lock protection control that rotates the two motors such that the vehicle is turned toward one side about a center of turning and subsequently rotates the two motors such that the vehicle is turned toward the other side about the center of turning.

* * * * *